July 12, 1927.
G. W. SMITH
1,635,645
MUD PULLER FOR AUTOMOBILES
Filed Aug. 10, 1925
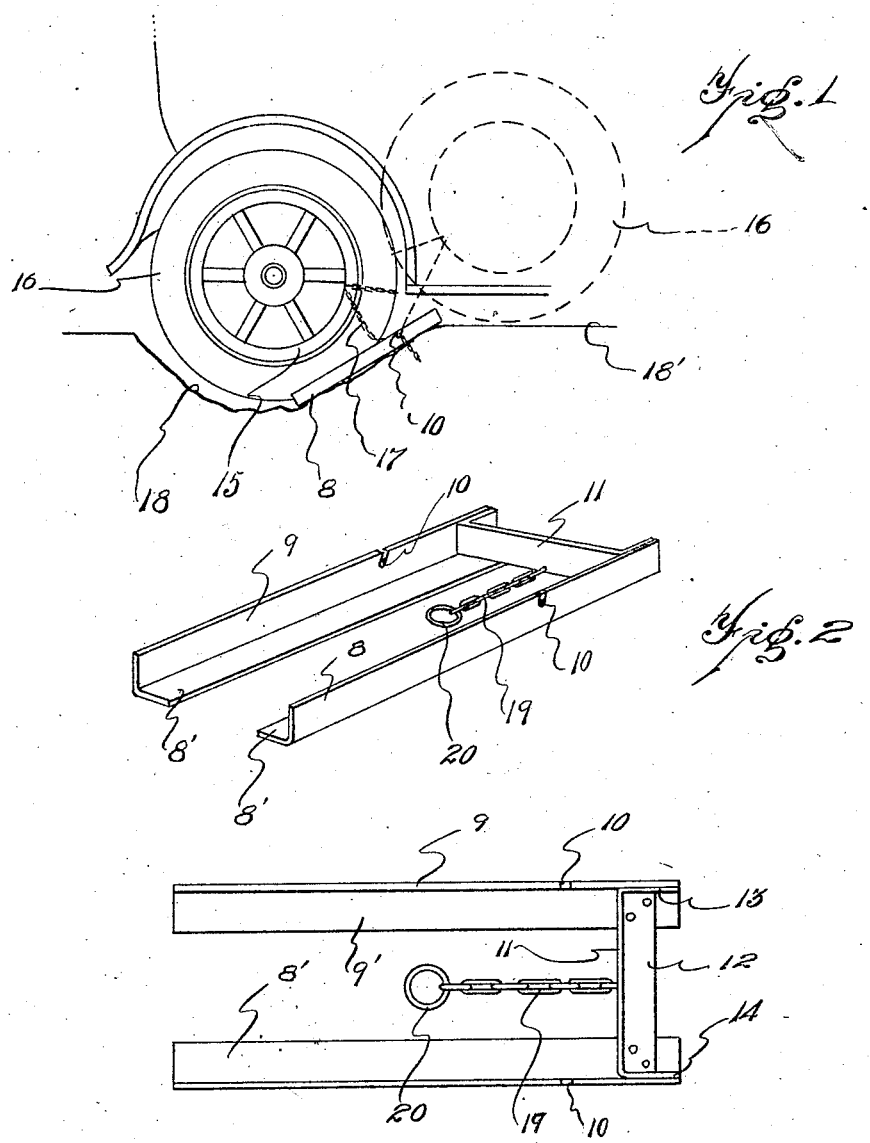
INVENTOR.
GUY W. SMITH
BY Thos. A. Donnell
ATTORNEY.

Patented July 12, 1927.

1,635,645

UNITED STATES PATENT OFFICE.

GUY W. SMITH, OF DETROIT, MICHIGAN.

MUD PULLER FOR AUTOMOBILES.

Application filed August 10, 1925. Serial No. 49,257.

My invention relates to a new and useful improvement in a mud puller for automobiles and provides a device which may be positioned forwardly in close proximity to the traction wheels of an automobile when the same is mired in the mud, to present in the path of the automobile a hindrance which will serve to raise the automobile upon the wheel passing thereover and against which the vehicle wheel will grip sufficiently to effect a forward propelling of the vehicle.

It is another object of the invention to provide a device of this class which may be attached to the wheel so that as the wheel attempts to spin idly the device will be pulled under the wheel to provide the necessary gripping surface to assist the wheel in propelling the vehicle forward.

Another object of the invention is the provision of a device of this class simple in construction, economical of manufacture and highly efficient in use.

Other objects will appear hereinafter.

The invention consists in the combination and arrangement of parts hereinafter described and claimed.

Figure 1:
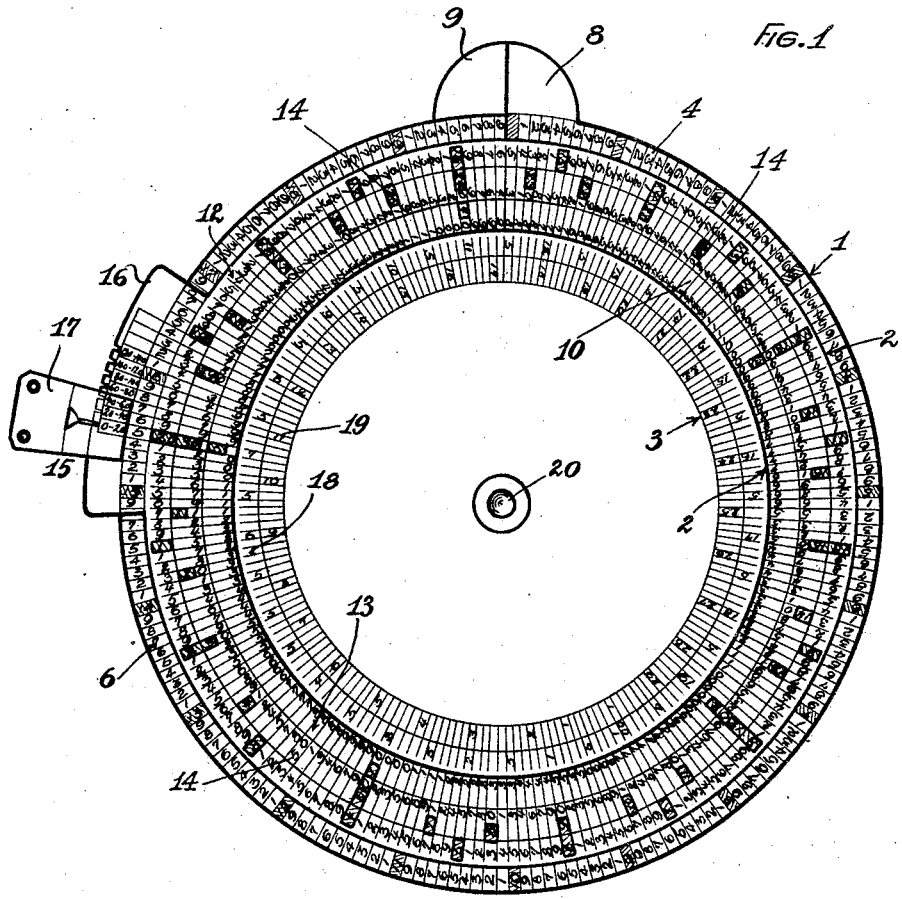
Figure 2:
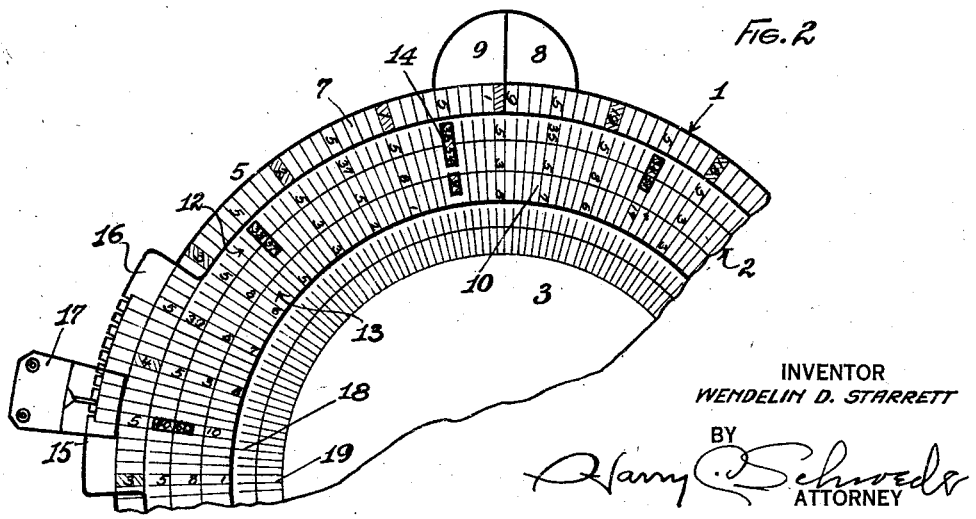

The invention will be best understood from a reference to the accompanying drawings which form a part of this specification, and in which, Fig. 1 is a side elevational view of the invention showing it applied to an automobile shown in fragment, Fig. 2 is a perspective view of the invention, Fig. 3 is a top plan view of the invention.

The invention comprises a pair of angle irons extended in parallel relation to each other and spaced apart, one of the sides 8 and 9 of each of these angle irons being extended upwardly and the other side 8' and 9', respectively, being positioned in a horizontal plane and adapted, when in use, to lie in engagement with the ground or other surface over which the vehicle is being propelled. Each of the upwardly projecting portions 8 and 9 is provided adjacent its end with a rearwardly inclined slot 10. These angle irons are secured together at their forward ends by means of an angle iron, one side 11 of which is projected upwardly. The other side 12 lies in engagement with the upper surfaces of the portions 8' and 9'. The upwardly extended portion 11 is projected beyond the ends of the portion 12 to provide angularly turned portions 13 and 14, which lie in engagement with the portions 8 and 9 and are suitably secured thereto by riveting, welding, or the like. The portion 12 is also secured to the portions 8' and 9' by riveting or the like.

The device is adapted for use with vehicles, particularly automobiles, and in the drawings is shown applied to an automobile having a wheel provided with a felly 15 and a tire 16. When the wheel becomes mired in the rut 18 a chain 17 may be passed around the felly as shown in Fig. 1 and its ends slipped into the notches 10. The U-shaped member will be positioned forwardly of the wheel and in close proximity to it as shown in Fig. 1. As the motor is started and the wheel commences to spin, the chain 17 will tend to draw the U-shaped member under the wheel so that the wheel may engage the upstanding portion 11 and ride over it. As the wheel rides over the portion 11, the vehicle is raised so as to pass on to the level surface 18', as shown in dotted lines in Fig. 1. The wheel when beginning to spin effects a rearward pulling on the inclined slots 10, and as the wheel passes over the portion 11, the ends of the chain will disengage from the slots 10 so that the device is not carried forwardly with the vehicle, and thus no injury can be effected on the fender of the wheel.

If the vehicle is mired in a rut of considerable length, it is of course evident that the application of the device forwardly of the wheel would have to be carried out several times in order to permit the removal of the vehicle from the rut entirely. However, with short ruts a single application will prove sufficient to raise the vehicle out of the rut.

Secured to the angle iron which connects the parallel extending irons is a chain 19 having at its end a ring 20. This chain will lie directly in the path of the wheel of the vehicle and be ridden over by the wheel, the chain and ring affording an additional gripping surface for the wheel to engage against. The parallel extending angle irons are spaced apart sufficiently to permit the wheel to lie between them so that the tire will not in any wise be injured by the edges of these parallel extending angle irons. If desired, the inner edges of these parallel extending angle irons may be curled slightly to further guard against any injury to the tire.

July 12, 1927.

W. D. STARRETT

SLOPE STAKE CALCULATOR

Filed July 23, 1923

1,635,646

3 Sheets-Sheet 1

INVENTOR
WENDELIN D. STARRETT
BY
Harry C. Schwede
ATTORNEY